United States Patent
Raman et al.

(10) Patent No.: US 12,081,659 B2
(45) Date of Patent: Sep. 3, 2024

(54) SYSTEM AND METHOD TO RANDOMIZE DISTRIBUTION OF CRYPTOGRAPHIC KEYS ACROSS MULTIPLE SECURE KEY STORAGE DEVICES

(71) Applicant: Tata Consultancy Services Limited, Mumbai (IN)

(72) Inventors: Malini Raman, Chennai (IN); Namitha Jeremiah, Chennai (IN); Rohit Trivedi, Thane West (IN); Ashok Seshadri, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 237 days.

(21) Appl. No.: 17/932,947

(22) Filed: Sep. 16, 2022

(65) Prior Publication Data
US 2023/0103259 A1    Mar. 30, 2023

(30) Foreign Application Priority Data
Sep. 30, 2021    (IN) .............................. 202121044405

(51) Int. Cl.
*H04L 9/08*    (2006.01)
*H04L 9/06*    (2006.01)

(52) U.S. Cl.
CPC .......... *H04L 9/0869* (2013.01); *H04L 9/0643* (2013.01); *H04L 9/0894* (2013.01)

(58) Field of Classification Search
None
See application file for complete search history.

(56) References Cited

U.S. PATENT DOCUMENTS

| | | |
|---|---|---|
| 7,120,696 B1 * | 10/2006 | Au .................. H04L 9/0891 713/400 |
| 10,075,298 B2 | 9/2018 | Struttmann |
| 10,778,439 B2 | 9/2020 | Cheng et al. |
| 11,082,235 B2 | 8/2021 | Monica et al. |
| 11,394,561 B2 | 7/2022 | Jarjoui et al. |
| 2018/0046586 A1 * | 2/2018 | Venkatesh ............... G06F 3/067 |
| 2020/0153627 A1 * | 5/2020 | Wentz ...................... H04L 9/50 |
| 2022/0253813 A1 * | 8/2022 | Pospieszalski ........... H04L 9/50 |

\* cited by examiner

*Primary Examiner* — Philip J Chea
*Assistant Examiner* — James Ross Hollister
(74) *Attorney, Agent, or Firm* — FINNEGAN, HENDERSON, FARABOW, GARRETT & DUNNER LLP

(57) ABSTRACT

Existing systems enable secure storage of encryption keys in the form of digital wallets, however, since the keys are preconfigured, they can be prone to malicious attacks. The embodiments herein provide a method and system for randomizing distribution of cryptographic keys across multiple secure key storage devices. The system generates random storage identities (RSIDs) for secure key storage devices by selecting a random storage device from a device portfolio, assigns the RSIDs randomly to create crypto addresses based on random access and partition the devices by deriving crypto addresses. Further, the system generates a user hash function and maps the user hash function to find an associated RSID hash function. The system identifies a device ID, a partition ID and a business date from a device mapper associated with the RSIDs to regenerate new RSIDs and recommends the regenerated new RSIDs randomly to each of the plurality of devices.

15 Claims, 2 Drawing Sheets

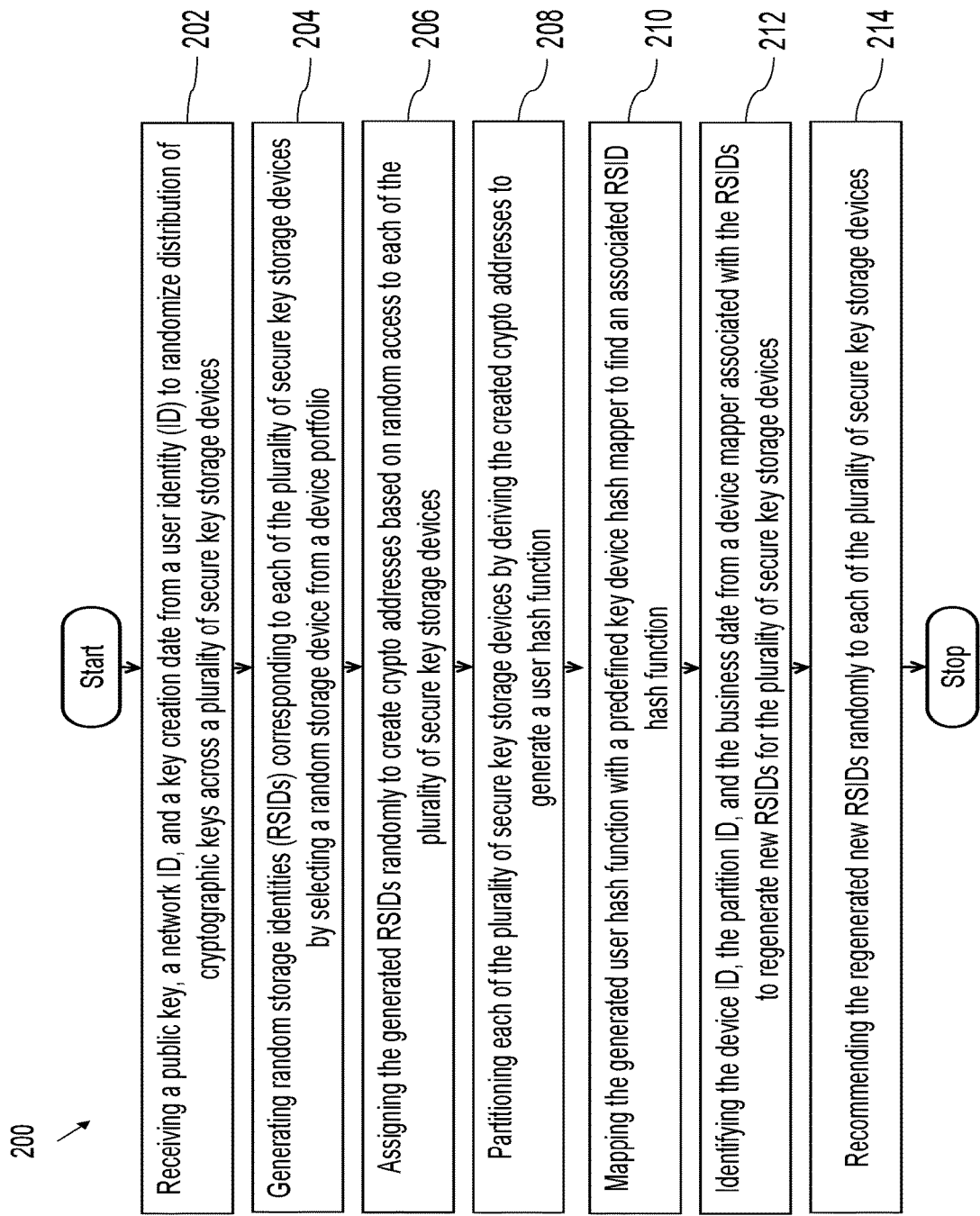

SYSTEM AND METHOD TO RANDOMIZE DISTRIBUTION OF CRYPTOGRAPHIC KEYS ACROSS MULTIPLE SECURE KEY STORAGE DEVICES

CROSS-REFERENCE TO RELATED APPLICATIONS AND PRIORITY

This U.S. patent application claims priority under 35 U.S.C. § 119 to Indian Application number 202121044405, filed on Sep. 30, 2021. The entire contents of the aforementioned application are incorporated herein by reference.

TECHNICAL FIELD

The disclosure herein generally relates to a field of a random storage of crypto credentials and more specifically, to a system and method to randomize distribution of cryptographic keys across multiple secure key storage devices.

BACKGROUND

Increased adoption of digital technologies such as blockchain, Internet of Things (IoT) and cloud drives the need to implement cryptography into almost every application. Cryptographic systems require a secure way of storing and managing keys to prevent vulnerabilities amidst the growing sophistication of cyber-attacks. Existing systems enable secure storage of encryption keys in the form of digital wallets, which can be used to sign digital transactions. The wallets can be software wallets or hardware wallets such as secure key storage devices. However, since the keys are preconfigured, they are prone to malicious attacks such as hacking, as easy identification of target storage location increases the vulnerability of the wallets.

Further, maintaining a static storage medium for the keys leads to security threats and are prone to hacking. Hence, it is essential to not only randomize the storage medium with respect to key parameters such as customer profile, transaction value, transaction type etc., but also equally important that the process is made completely transparent to the customer.

SUMMARY

Embodiments of the disclosure present technological improvements as solutions to one or more of the above-mentioned technical problems recognized by the inventors in conventional systems. For example, in one embodiment, a method and system to randomize distribution of cryptographic keys across multiple secure key storage devices is provided.

In one aspect, a processor-implemented method to randomize distribution of cryptographic keys across multiple secure key storage devices is provided. The method includes one or more steps such as receiving, via an input/output interface, a request from a user identity (ID) to randomize distribution of cryptographic keys across a plurality of secure key storage devices, generating random storage identities (RSIDs) for the plurality of storage devices by selecting a random storage device from a device portfolio, assigning the generated RSIDs randomly to create crypto addresses based on random access, partitioning each of the plurality of storage devices by deriving crypto addresses, generating a user hash function with received user identity (ID), the public key, a network ID, and a key creation date, mapping the generated user hash function with a predefined key device hash mapper table to find an associated RSID hash function, identifying device ID, partition ID and a business date from a device mapper associated with the RSIDs to regenerate new RSIDs for the plurality of storage devices, and finally recommending the regenerated new RSIDs randomly to each of the plurality of storage devices.

In another aspect, a system is configured for randomizing distribution of cryptographic keys across multiple secure key storage devices is provided. The system includes an input/output interface configured to receive a request from a user identity (ID) to randomize distribution of cryptographic keys across a plurality of secure key storage devices, one or more hardware processors and at least one memory storing a plurality of instructions, wherein the one or more hardware processors are configured to execute the plurality of instructions stored in at least one memory.

Further, the system is configured to generate random storage identities (RSIDs) for the plurality of storage devices by selecting a random storage device from a device portfolio, assign the generated RSIDs randomly to create crypto addresses based on random access and partition each of the plurality of storage devices by deriving crypto addresses. Further, the system is configured to generate a user hash function with the received user ID, the public key, a network ID, and a key creation date to map the generated user hash function with a predefined key device hash mapper table to find an associated RSID hash function, identifies device ID, partition ID and a business date from a device mapper associated with the RSIDs to regenerate new RSIDs for the plurality of secure key storage devices and finally recommends the regenerated new RSIDs randomly to each of the plurality of secure key storage devices.

In yet another aspect, one or more non-transitory machine-readable information storage mediums are provided comprising one or more instructions, which when executed by one or more hardware processors causes a method of randomizing distribution of cryptographic keys across multiple secure key storage devices is provided. The method includes one or more steps such as receiving, via an input/output interface, a request from a user identity (ID) to randomize distribution of cryptographic keys across a plurality of secure key storage devices, generating random storage identities (RSIDs) for the plurality of secure key storage devices by selecting a random storage device from a device portfolio, assigning the generated RSIDs randomly to create crypto addresses based on random access, partitioning each of the plurality of secure key storage devices by deriving crypto addresses, generating a user hash function with received user ID, the public key, a network ID, and a key creation date, mapping the generated user hash function with a predefined key device hash mapper table to find an associated RSID hash function, identifying device ID, partition ID and a business date from a device mapper associated with the RSIDs to regenerate new RSIDs for the plurality of secure key storage devices, and finally recommending the regenerated new RSIDs randomly to each of the plurality of secure key storage devices.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram to illustrate a method of randomizing distribution of cryptographic keys across multiple secure key storage devices, in accordance with some embodiments of the present disclosure.

Figure 1:
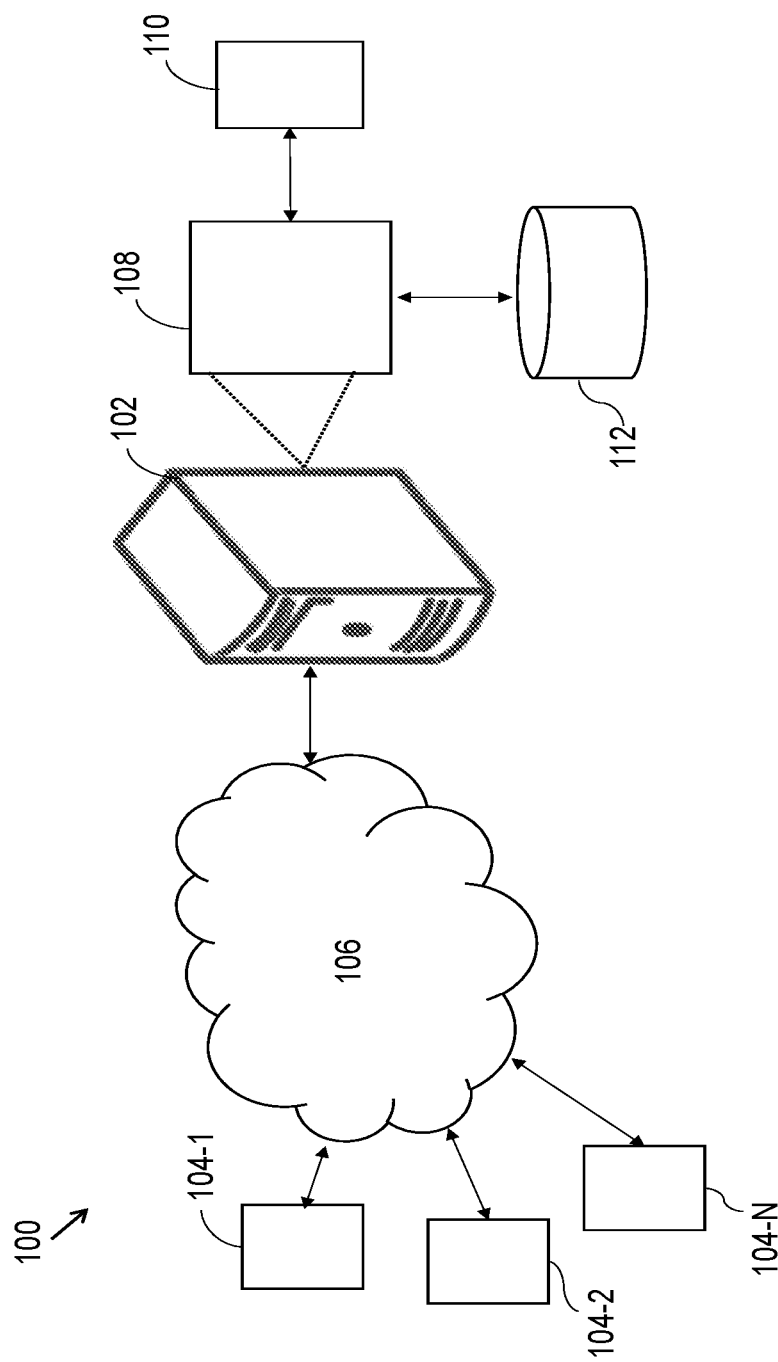
FIG. 1 illustrates an exemplary system for randomizing distribution of cryptographic keys across multiple secure key storage devices in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for randomizing distribution of cryptographic keys across multiple secure key storage devices. It has been observed that Random Storage Algorithm (RSA) is a deterministic mechanism implemented by system crypto services. The RSA creates crypto credentials of users by selecting a random storage device from a device portfolio managed by the system application. Public key and the derived crypto addresses reside on-chain while private key is residing on a partition of a random storage device. Randomness quotient generated by the system crypto services for selecting a storage device is secured in an ecosystem and is opaque to external adversaries so that the devices on which credentials are residing cannot be derived from external environment. Above everything, the system also erases off-chain mapping of credentials with its storage device. This mapping is not maintained in the ecosystem and is derived as and when required for a secured and tamper-proof cryptographic signature powered with randomness.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 illustrates a block diagram of a system (100) for randomizing distribution of cryptographic keys across multiple secure key storage devices, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules therein. The one or more I/O interfaces (104) are configured to receive a request from a user identity (ID) to randomize distribution of cryptographic keys across a plurality of storage devices such as secure key storage devices. The one or more I/O interfaces (104) are also configured to recommend the regenerated new RSIDs randomly to each of the plurality of secure key storage devices. The components and functionalities of the system (100) are described further in detail.

In one embodiment, the system (100) is configured to generate random storage identities (RSIDs) for the plurality of secure key storage devices by selecting a random storage device from a device portfolio. It is to be noted that the system (100) maintains the device portfolio in which different storage devices are identified with their respective device IDs and the partitions available from each device which is partition ID (PID). This is a portfolio which denotes that these devices are available to the user to create required crypto credentials. The device portfolio manages the health monitoring of the storage device and records its uptime and throws alert if connectivity to any device is obstructed or is down as shown in Table 1.

TABLE 1

| Device Name | Device ID | PID | Uptime | Status |
|---|---|---|---|---|
| Thales Gemalto | GM0101 | GMPID01 | 3 hrs 9 mins | Running |
| Thales Gemalto | GM0102 | GMPID02 | 3 hrs 9 mins | Running |

TABLE 1-continued

| Device Name | Device ID | PID | Uptime | Status |
|---|---|---|---|---|
| Thales Gemalto | GM0103 | GMPID03 | 3 hrs 9 mins | Running |
| IBM Hyperprotect | HY0101 | HYPID01 | 2 hrs 21 mins | Running |
| GK8 | GK0101 | GKPID01 | 2 hrs 21 mins | Running |
| Intel SGX | SG0101 | SGPID01 | 1 hr 55 mins | Running |
| n . . . | n . . . | n . . . | n . . . | n . . . |

It is to be noted that the system (100) maintains a list of all storage devices with their partition IDs (PIDs) for each business day and assigns the generated RSIDs randomly to create crypto addresses based on random access to each storage device. A time-based process running at Beginning of Day (BOD) publishes a list of devices as per Table 2 along with a new random RSID allocated to each device. The system (100) creates a list with below attributes and maintains the same as shown in Table 2:

TABLE 2

| S. No. | Device ID | PID | Business Date | RSID |
|---|---|---|---|---|
| 01 | GM0101 | GMPID01 | 25 Feb. 2020 | GM0101GMPID016 |
| 02 | GM0102 | GMPID02 | 25 Feb. 2020 | GM0102GMPID013 |
| 03 | GM0103 | GMPID03 | 25 Feb. 2020 | GM0103GMPID037 |
| 04 | HY0101 | HYPID01 | 25 Feb. 2020 | HY0101HYPID019 |
| 05 | GK0101 | GKPID01 | 25 Feb. 2020 | GK0101GKPID010 |
| 06 | SG0101 | SGPID01 | 25 Feb. 2020 | SG0101SGPID014 |
| 07 | SG0102 | SGPID02 | 25 Feb. 2020 | SG0102SGPID011 |
| n . . . | n . . . | n . . . | n . . . | n . . . | wherein, the crypto service creates a SHA-256 Hash of the device mapper record by concatenating device ID, PID, and a business date. Last character of the generated Hash is picked and if the last character is a number, the RSID is set a concatenated string of device ID, PID, and the derived digit. Herein, the generated hash value only resides in-memory for computation, and never stored.

In one instance, when the user, at the time of placing an account generation request, is asked to enter four mnemonic words with maximum of four characters per mnemonic word which can be any word in English dictionary as per wish of the user. The system (100) assigns an incremental nonce starting from '1' from the very first address generation request. This ensures that randomness is secured with a parameter which is bound to change. The system (100) then picks the mnemonic words entered in the same order entered by the user. Suppose nonce for this request is '1'(this is a very first address request on system), the system (100) picks the first word from four words and keep that word in its memory. If, the nonce for a request is '27' (this means it is 27th key generation request), that suggest that the system (100) is configured to pick the remainder (3rd word): 27/4=3rd word. If the nonce is fully divisible, which can be 28/4=0 (remainder), the system (100) always pick $1^{st}$ word. Further, the system (100) creates a SHA-256 hash of the user ID, Network ID, selected mnemonic word and business date which is called RSA-hash. Furthermore, the system computes the sum of derived RSA-hash by adding all the digits in the derived hash. Characters (letters) is converted into their ASCII value so that they can be added with the digits. The system (100) sums the digits until the sum is less than or equal to the total number of device available for allocation and assigns that sum to the same serial number of the Table 2.

In another instance, a few RSIDs as per RSA technique are always assigned for generating keys. To maintain approximate equality, the system (100) maintains a harmonic mean among RSIDs. At each address generation request, the system (100) checks the harmonic mean of keys generated by all RSIDs. Referring to Table 3, suppose on a business day, the system (100) has a list of 20 rows in the Table 2. The system (100) implements harmonic mean for maintaining uniformity after a pre-decided limit of suppose 40 address generation requests. Further requests undergo harmonic mean for achieving uniformity as the system (100) have already achieved randomness by using the RSA technique.

TABLE 3

| S. No. | RSID | Usage Count |
|---|---|---|
| 1 | GM0101GMPID016 | 1 |
| 2 | GM0102GMPID013 | 8 |
| 3 | GM0103GMPID037 | 4 |
| 4 | HY0101HYPID019 | 6 |
| 5 | GK0101GKPID010 | 8 |
| 6 | SG0101SGPID014 | 11 |
| 7 | SG0101SGPID011 | 2 | wherein at $41^{st}$ request of the user, the system (100) generate harmonic mean for the dataset in the Table 3.

The system (100) sums up the harmonic mean, divides the sum by total number of RSIDs and takes reciprocal of the above result to achieve harmonic mean. Further, the system (100) checks which RSID has less usage count than the achieved harmonic means that RSID is then assigned for $41^{st}$ address generation request. If multiple values are less than above mean, the system assigns to the RSID having lowest one. Hence, uniformity is maintained by calculating average mean in best possible way for RSID ownership.

In another embodiment, the system (100) requests the device associated with the assigned RSID for generating crypto credentials. The device generates keys, and the system (100) stores the user ID along with public key mapping as mentioned below in Table 4.

TABLE 4

| S. No. | User ID | Public Key | Network ID | Key Creation Date |
|---|---|---|---|---|
| 01 | Portfolio-1 | PK01 | BTC | 25 Feb. 2020 |
| 02 | Portfolio-2 | PK02 | BCHN | 25 Feb. 2020 |
| 03 | Portfolio-3 | PK03 | ETH | 25 Feb. 2020 |
| 04 | Portfolio-4 | PK04 | XRP | 25 Feb. 2020 |
| 05 | Portfolio-5 | PK05 | BCHN | 25 Feb. 2020 |
| n . . . | n . . . | n . . . | | n . . . |

The system (100) generates a user-hash which is a SHA-256 hash of user ID, public key, network ID, and key creation date and stores it in a Table 5. This is generated after creation of keys. Further, the system (100) also generates a RSID-hash for the device which is getting used for generating keys for this user ID. This is a SHA-256 hash of the device ID, PID, business date and RSID of the device which is getting used for generating the keys. This is inserted into the Table 5 along with the user-hash.

TABLE 5

| S. No. | User-Hash | RSID-Hash |
|---|---|---|
| 01 | bcb3439d23415b7c3da1f64 4137abca0943dfc7f9dc45f31 0e7559083f090096 | jkl35679a23415b7c3da1f64413 7cccc0943dfc7f9dc45f310e755 9083f091124 |
| 02 | ijk1236d23415b7c3da1f6441 37abca0943dfc7f9dc45f310e 7559083f010001 | fghi5679a23415b7c3da1f64413 7cccc0943dfc7f9dc45f310e755 9083f091235 |
| 03 | zkjh236d23415b7c3da1f644 137abca0943dfc7f9dc45f310 e7559083f05691 | xcv55679a23415b7c3da1f6441 37cccc0943dfc7f9dc45f310e75 59083f099346 |
| 04 | mmnr236d23415b7c3da1f64 4137abca0943dfc7f9dc45f31 0e7559083f0545k | xcv55679a23415b7c3da1f6441 37cccc0943dfc7f9dc45f310e75 59083f88671j |
| n . . . | n . . . | | wherein for Row-1 of the Table 5, keys were generated by GM0103GMPID037 of Row-3 of the Table 5. Row-1 of the Table 5 has corresponding mapping of hash for this request that links the user and the device.

In another embodiment, the system (100) is configured to map the generated user hash function with a predefined key device hash mapper (Table 5) to find an associated RSID hash function. Herein, the system identifies the device ID, the partition ID and the business date from a device hash mapper associated with the RSIDs to regenerate new RSIDs for the plurality of secure key storage devices.

In one example, wherein the system (100) generates a message "GM0101GMPID0125022020" for Row 01 of Table 2 and creates a SHA-256 hash of the message bcb3439d23415b7c3da1f644137abca0943dfc7f9dc45f31-0e7559083f090096. Further, the system picks last character i.e. 6 and assign the RSID GM0101GMPID016. Suppose another row for same business day generates a hash, in which last digit is already assigned. The system (100) checks for first character of the hash and assign that digit to RSID in the above format. If that digit is also already allocated, then the system (100) checks second last digit from the tail and if that is also already taken, the system (100) further checks second initial digit and so on. In case if tailing/leading character is a letter, the system (100) is configured to take ASCII value of that character (for example ASCII of b is 98) and then takes last digit of this value which is 8. If that digit is already taken, it skips the letter and check again the first character in the hash. If all digits are taken up (0-9) for a day and there are devices left or getting same digit again even before 0-9 is exhausted, the system may prefix derived digit with "1".

In another instance, wherein 0-9 digits are exhausted and there is last digit of hash as '9' or the derived digit is again a '9', the system (100) prefixes digit with 1 and hence RSID is "GM0103GMPID0119". If prefix '1' is exhausted for a digit, the system (100) may move forward prefixing with '2' for the same digit on a given business day. Hence, as per the flow, the RSID is populated in the above Table 2. Each business day, the date changes and thus the SHA-256 hash and a new RSID is recalculated and assigned to the same device. The hash of the newly generated RSIDs only resides in-memory for computation and is never stored.

In another example, wherein suppose portfolio-5 creates a transaction for which the system (100) needs to find the storage device which should be requested for signing the transaction. The system (100) picks user ID and checks its entry in the Table 1 and recreates the User-hash in-memory. Further, the system (100) picks this hash and checks in the Table 5 and finds the associated RSID-hash. The system (100) already knows key creation date for this user from the Table 4. The system (100) picks the key creation date and finds data entries for the same day in Table 2. For each entry available in the Table 2, the system (100) recreates the RSID-hash for the given creation date. The system (100) keeps matching the recreated RSID-hash with the RSID-hash available in the Table 5 for the given user-hash. Once, the hash match is found, the system (100) checks device ID and partition ID from the Table 2 associated with RSID. Based on the device and partition details, the system (100) requests storage device associated with the derived device ID to sign the transaction by passing the transaction object.

Referring FIG. 2, to illustrate a processor-implemented method (200) for randomizing distribution of cryptographic keys across multiple secure key storage devices in accordance with an example embodiment.

Initially, at the step (202), receiving a public key, a network ID, and a key creation date from a user identity (ID) to randomize distribution of cryptographic keys across a plurality of secure key storage devices, wherein each the plurality of secure key storage devices is identified with a respective device ID.

At the next step (204), generating random storage identities (RSIDs) corresponding to each of the plurality of secure key storage devices by selecting a random storage device from a device portfolio.

At the next step (206), assigning the generated RSIDs randomly to create crypto addresses based on random access to each of the plurality of secure key storage devices.

At the next step (208), partitioning each of the plurality of secure key storage devices by deriving the created crypto addresses to generate a user hash function based on the user ID, the public key, the network ID, and the key creation date. The crypto addresses create the SHA-256 hash function of the device mapper record by concatenating the device ID, the partition ID, and the business date. In one instance, wherein a last character of the created SHA-256 hash function is picked and the last character is a digit and the RSID is set a concatenated string of the device ID, the partition ID, and the digit.

At the next step (210), mapping the generated user hash function with a predefined key device hash mapper to find an associated RSID hash function.

At the next step (212), identifying the device ID, the partition ID, and the business date from a device mapper associated with the RSIDs to regenerate new RSIDs for the plurality of secure key storage devices.

At the last step (214), recommending the regenerated new RSIDs randomly to each of the plurality of secure key storage devices. Further, a randomness quotient is calculated for selecting at least one of the plurality of secure key storage devices secured in an ecosystem which is opaque to external adversaries.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of malicious attacks such as hacking as easy identification of target storage location increases the vulnerability of digital wallets. Therefore, embodiments herein provide a system and method for randomizing distribution of cryptographic keys across multiple secure key storage devices. It has been observed that Random Storage Algorithm (RSA) is a deterministic mechanism implemented by system crypto services. The RSA creates crypto credentials of users by selecting a random storage device from a device portfolio managed by the system application. Public key and the derived crypto addresses reside on-chain while private key is residing on a partition of a random storage device. Randomness quotient generated by the system crypto services for selecting a storage device is secured in an ecosystem and is opaque to external adversaries so that the device on which credentials are residing cannot be derived from external environment. Above everything, the system also erases off-chain mapping of credentials with its storage device. This mapping is not maintained in the ecosystem and is derived as and when required for a secured and tamper-proof cryptographic signature powered with randomness.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
   receiving, via an input/output interface, a public key, a network ID, and a key creation date from a user identity (ID) to randomize distribution of cryptographic keys across a plurality of secure key storage devices, wherein each the plurality of secure key storage devices is identified with a respective device ID;
   generating, via one or more hardware processors, random storage identities (RSIDs) corresponding to each of the plurality of secure key storage devices by selecting a random storage device from a device portfolio;
   assigning, via the one or more hardware processors, the generated RSIDs randomly to create crypto addresses based on random access to each of the plurality of secure key storage devices;
   partitioning, via the one or more hardware processors, each of the plurality of secure key storage devices by deriving the created crypto addresses to generate a user hash function based on the user ID, the public key, the network ID, and the key creation date;
   mapping, via the one or more hardware processors, the generated user hash function with a predefined key device hash mapper to find an associated RSID hash function;
   identifying, via the one or more hardware processors, the device ID, the partition ID, and the business date from a device mapper associated with the RSIDs to regenerate new RSIDs for the plurality of secure key storage devices; and
   recommending, via the input/output interface, the regenerated new RSIDs randomly to each of the plurality of secure key storage devices.

2. The processor-implemented method of claim 1, wherein a randomness quotient is calculated for selecting at least one of the plurality of secure key storage devices secured in an ecosystem which is opaque to external adversaries.

3. The processor-implemented method of claim 1, wherein crypto addresses create the SHA-256 hash function of the device mapper record by concatenating the device ID, the partition ID, and the business date.

4. The processor-implemented method of claim 3, wherein a last character of the created SHA-256 hash function is picked if the last character is a digit and the RSID is set a concatenated string of the device ID, the partition ID, and the digit.

5. The processor-implemented method of claim 1, wherein a uniform distribution of the generated RSIDs is based on a harmonic mean among the generated RSIDs.

6. The processor-implemented method of claim 1, wherein the hash function of the newly generated RSIDs only resides in-memory for computation.

7. The processor-implemented method of claim 1, wherein the derived crypto addresses, and a public key reside on-chain and a private key resides in the plurality of secure key storage devices.

8. A system comprising:
an input/output interface to receive a public key, a network ID, and a key creation date from a user identity (ID) to randomize distribution of cryptographic keys across a plurality of secure key storage devices, wherein each the plurality of secure key storage devices is identified with a respective device ID;
one or more hardware processors;
a memory in communication with the one or more hardware processors, wherein the one or more hardware processors are configured to execute programmed instructions stored in the memory, to:
generate random storage identities (RSIDs) corresponding to each of the plurality of secure key storage devices by selecting a random storage device from a device portfolio;
assign the generated RSIDs randomly to create crypto addresses based on random access to each of the plurality of secure key storage devices;
partition each of the plurality of secure key storage devices by deriving the created crypto addresses to generate a user hash function based on the user ID, the public key, the network ID, and the key creation date;
mapping the generated user hash function with a predefined key device hash mapper to find an associated RSID hash function;
identify the device ID, the partition ID, and the business date from a device mapper associated with the RSIDs to regenerate new RSIDs for the plurality of secure key storage devices; and
recommend the regenerated new RSIDs randomly to each of the plurality of secure key storage devices.

9. The system of claim 8, wherein a randomness quotient is calculated for selecting at least one of the plurality of secure key storage devices secured in an ecosystem which is opaque to external adversaries.

10. The system of claim 8, wherein crypto addresses create the SHA-256 hash function of the device mapper record by concatenating the device ID, the partition ID, and the business date.

11. The system of claim 10, wherein a last character of the created SHA-256 hash function is picked if the last character is a digit and the RSID is set a concatenated string of the device ID, the partition ID, and the digit.

12. A non-transitory computer readable medium storing one or more instructions which when executed by one or more processors on a system, cause the one or more processors to perform method comprising:
receiving, via an input/output interface, a public key, a network ID, and a key creation date from a user identity (ID) to randomize distribution of cryptographic keys across a plurality of secure key storage devices, wherein each the plurality of secure key storage devices is identified with a respective device ID;
generating, via one or more hardware processors, random storage identities (RSIDs) corresponding to each of the plurality of secure key storage devices by selecting a random storage device from a device portfolio;
assigning, via the one or more hardware processors, the generated RSIDs randomly to create crypto addresses based on random access to each of the plurality of secure key storage devices;
partitioning, via the one or more hardware processors, each of the plurality of secure key storage devices by deriving the created crypto addresses to generate a user hash function based on the user ID, the public key, the network ID, and the key creation date;
mapping, via the one or more hardware processors, the generated user hash function with a predefined key device hash mapper to find an associated RSID hash function;
identifying, via the one or more hardware processors, the device ID, the partition ID, and the business date from a device mapper associated with the RSIDs to regenerate new RSIDs for the plurality of secure key storage devices; and
recommending, via the input/output interface, the regenerated new RSIDs randomly to each of the plurality of secure key storage devices.

13. The non-transitory computer readable medium of claim 12, wherein a randomness quotient is calculated for selecting at least one of the plurality of secure key storage devices secured in an ecosystem which is opaque to external adversaries.

14. The non-transitory computer readable medium of claim 12, wherein crypto addresses create the SHA-256 hash function of the device mapper record by concatenating the device ID, the partition ID, and the business date.

15. The non-transitory computer readable medium of claim 14, wherein a last character of the created SHA-256 hash function is picked if the last character is a digit and the RSID is set a concatenated string of the device ID, the partition ID, and the digit.

* * * * *